United States Patent
Choi et al.

(10) Patent No.: US 7,646,443 B2
(45) Date of Patent: Jan. 12, 2010

(54) ARRAY SUBSTRATE FOR LIQUID CRYSTAL DISPLAY DEVICE AND METHOD OF FABRICATING THE SAME

(75) Inventors: Nack-Bong Choi, Gyeonggi-do (KR);
Ho-Cheol Kang, Gyeonggi-do (KR);
Dae-Won Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 481 days.

(21) Appl. No.: 11/639,232

(22) Filed: Dec. 15, 2006

(65) Prior Publication Data
US 2007/0290229 A1    Dec. 20, 2007

(30) Foreign Application Priority Data
Jun. 19, 2006   (KR)  ............ 10-2006-0055089

(51) Int. Cl.
*G02F 1/136*    (2006.01)
(52) U.S. Cl. ............ 349/43; 349/42; 257/59; 257/72
(58) Field of Classification Search .......... 349/42–43, 349/139; 257/59, 72
See application file for complete search history.

(56) References Cited
U.S. PATENT DOCUMENTS
6,458,636 B1 * 10/2002 Yi et al. .............. 438/150
6,717,631 B2 * 4/2004 Choi .................. 349/43
7,294,924 B2 * 11/2007 Kim .................. 257/707

FOREIGN PATENT DOCUMENTS
CN    1905203 A    1/2007

* cited by examiner

Primary Examiner—Dung T. Nguyen
(74) Attorney, Agent, or Firm—Holland & Knight LLP

(57) ABSTRACT

An array substrate for a liquid crystal display device includes a first source electrode and a first drain electrode on a substrate, wherein the first source electrode and the first drain electrode are separated from each other and formed of a metallic material, a second source electrode and a second drain electrode on the first source electrode and the first drain electrode, respectively, and are formed of a transparent conductive material, wherein the second source electrode covers an upper surface of the first source electrode, and the second drain electrode covers an upper surface of the first drain electrode, a pixel electrode on the substrate and contacting the second drain electrode on the substrate, an organic semiconductor layer on the substrate, a gate insulating layer on the organic semiconductor layer, and a gate electrode on the gate insulating layer.

28 Claims, 9 Drawing Sheets

ARRAY SUBSTRATE FOR LIQUID CRYSTAL DISPLAY DEVICE AND METHOD OF FABRICATING THE SAME

The present application claims the benefit of Korean Patent Application No. 2006-0055089 filed in Korea on Jun. 19, 2006, which is hereby incorporated by reference in its entirety.

BACKGROUND OF THE INVENTION

1. Field of the Invention

Embodiments of the invention relate to a display device, more particularly, to an array substrate for liquid crystal display device and a method of fabricating the same.

2. Discussion of the Related Art

Generally, a liquid crystal display (LCD) includes a first substrate, a second substrate, and a liquid crystal layer. The first and second substrates face each other and are spaced apart from each other. The liquid crystal layer is interposed between the first and second substrates. The LCD device uses optical anisotropy and polarization properties of liquid crystal molecules to display images.

The liquid crystal molecules have orientation or arrangement characteristics resulting from their thin long shape. Such characteristics of the liquid crystal molecules can be controlled by applying an electric field. More particularly, the LCD device can include a thin film transistor (TFT) as a switching element to control application of the electric field. An LCD using a TFT is referred to as an active matrix LCD (AM-LCD) device, which has high resolution and smoothly displays moving images.

FIG. 1 is an exploded perspective view of a related art LCD device. As shown in FIG. 1, the LCD device includes first and second substrates 12 and 22, and a layer of liquid crystal molecules 30. The first and second substrates 12 and 22 face each other with the layer of liquid crystal molecules 30 interposed therebetween. The first substrate 12 includes a gate line 14, a data line 16, a thin film transistor (TFT) "T", and a pixel electrode 18. The gate line 14 and the data line 16 cross each other such that a pixel region "P" is defined between the gate and data lines 14 and 16. The TFT "T" is formed adjacent to where the gate and data lines 14 and 16 cross each other. The pixel electrode 18 is formed within the pixel region "P" and connected to the TFT "T".

The second substrate 22 includes a black matrix 25, a color filter layer 26, and a common electrode 28. The black matrix 25 has a lattice shape that covers non-display regions of the first substrate 12, such as the gate line 14, the data line 16, and the TFT "T." The color filter layer 26 includes first, second, and third sub-color filters 26a, 26b, and 26c. Each of the sub-color filters 26a, 26b, and 26c is respectively one of red, green, and blue colors "R", "G", and "B" and are respectively positioned in a pixel region "P". The common electrode 28 is formed on the black matrix 25 and the color filter layers 26 so as to be over the entire surface of the second substrate 22. As mentioned above, the arrangement or orientation of the liquid crystal molecules is controlled by an electric field applied between the pixel electrode 18 and the common electrode 28 such that the amount of transmitted light is controlled. By using a plurality of pixels "P," the LCD device displays images.

Although not shown in FIG. 1, a seal pattern may be formed along edges of the first and second substrates 12 and 22 to prevent the liquid crystal molecules 30 from leaking. First and second alignment layers may be formed between the first substrate 12 and the liquid crystal layer 30 as well as between the second substrate 22 and the liquid crystal layer 30. A polarizer can be formed on at least an outer surface of the first and second substrates 12 and 22.

The LCD device can also include a backlight assembly at an outer surface of the first substrate 12 to supply light to the liquid crystal layer 30. In this case, the polarizer can be positioned between the first substrate 12 and the backlight assembly. The light passes through the first substrate 12, the liquid crystal layer 30 and the second substrate 22 such that the LCD device displays images.

In the past, glass plates were used for the first and second substrates 12 and 22. However, a flexible plate, such as a plastic plate, can be used for the first and second substrates 12 and 22 because the flexible plate is much lighter and more flexible than a glass plate. Unfortunately, since a process of fabricating an array substrate is performed at a temperature higher than about 200° C., it is very difficult to substitute a flexible plate for a glass plate. Further, when the semiconductor layer is formed of one of amorphous silicon and polycrystalline silicon at a temperature lower than about 200° C., electrical characteristics of the TFT are unsatisfactory. To resolve these problems, a method of fabricating the array substrate at a temperature lower than about 200° C. using an organic semiconductor material to form the TFT on the flexible substrate has been suggested.

A metal material for electrodes, an insulating material and a passivation layer can be formed on the flexible substrate by one of low-temperature deposition and coating processes. These methods do not affect the electrical characteristics of the TFT. However, when the semiconductor layer is formed of amorphous silicon at a temperature lower than about 200° C., there are electrical conductivity problems. To overcome these problems, the semiconductor layer is formed of an organic semiconductor material instead of amorphous silicon.

FIG. 2 is a cross-sectional view showing an array substrate for an LCD device according to the related art. A source electrode 55, a drain electrode 57, a data line (not shown), a pixel electrode 60, an organic semiconductor layer 63 and a gate insulating layer 67 are formed on a first substrate 51, which is either a plastic plate or a glass plate. The source electrode 55, the drain electrode 57 and the data line are formed on the substrate 51 by depositing and patterning a metal layer (not shown). The source and drain electrodes 55 and 57 are separated from each other. The metal layer may include gold (Au) and have a high work function. The source electrode 55 extends from the data line.

A transparent conductive layer (not shown) is deposited on the source and drain electrodes 55 and 57. The transparent conductive layer is patterned such that the pixel electrode 60 is formed on the substrate 51. The pixel electrode 60 is connected to the drain electrode 57.

The organic semiconductor layer 63 is formed of an organic semiconductor material layer (not shown) using a shadow mask (not shown). The organic semiconductor material layer is either deposited or coated. The organic semiconductor layer 63 contacts the source and drain electrodes 55 and 57. The gate insulating layer 67 is formed both on the semiconductor layer 63 and the pixel electrode 60.

As mentioned above, the source and drain electrodes 55 and 57 and the data line are formed of gold because gold has a high work function and low resistance. The work function of the gold is about 5.1 eV. The organic semiconductor material includes one of pentacene and polythiophene. There is an energy barrier at the interface between the organic semiconductor layer of pentacene (or polythiophene) and the source electrode (or drain electrode). However, when the source and drain electrodes are formed of a metal having a high work function, the energy barrier is reduced. Thus, the energy barrier between the organic semiconductor layer and the source electrode and between the organic semiconductor layer and the drain electrode is reduced by forming the source and drain electrodes from gold, which has a high work function, so as to improve the electrical characteristics of the TFT. However, when the source and drain electrodes are formed of gold, it is difficult to control widths of the source and drain electrode because gold diffuses easily. Moreover, when the gold is deposited in the chamber, the gold is deposited on the wall of the chamber. The deposited gold can subsequently drop onto the substrate during the process so as to deteriorate the LCD device. Further, production costs are increased because of the gold being wasted on the walls of the chamber.

SUMMARY OF THE INVENTION

Accordingly, embodiments of the invention are directed to an array substrate for an LCD device and a method of fabricating the same that substantially obviate one or more of the problems due to limitations and disadvantages of the related art.

An object of embodiments of the invention is to provide an array substrate for an LCD device and a method of fabricating the same having reduced costs.

Additional features and advantages of embodiments of the invention will be set forth in the description which follows, and in part will be apparent from the description, or may be learned by practice of the embodiments of the invention. The objectives and other advantages of embodiments of the invention will be realized and attained by the structure particularly pointed out in the written description and claims hereof as well as the appended drawings.

To achieve these and other advantages and in accordance with the purpose of the invention, as embodied and broadly described herein, an array substrate for a liquid crystal display device includes a first source electrode and a first drain electrode on a substrate, wherein the first source electrode and the first drain electrode are separated from each other and formed of a metallic material, a second source electrode and a second drain electrode on the first source electrode and the first drain electrode, respectively, and are formed of a transparent conductive material, wherein the second source electrode covers an upper surface of the first source electrode, and the second drain electrode covers an upper surface of the first drain electrode, a pixel electrode on the substrate and contacting the second drain electrode on the substrate, an organic semiconductor layer on the substrate, a gate insulating layer on the organic semiconductor layer, and a gate electrode on the gate insulating layer.

In another aspect of the present invention, a method of fabricating an array substrate for a liquid crystal display device includes forming a first source electrode and a first drain electrode of a metallic material on a substrate separated from each other, forming a second source electrode and a second drain electrode of a transparent conductive material on the first source electrode and the first drain electrode, respectively, wherein the second source electrode covers an upper surface of the first source electrode, and the second drain electrode covers an upper surface of the first drain electrode, forming a pixel electrode contacting the second drain electrode on the substrate, forming an organic semiconductor layer on the substrate, forming a gate insulating layer on the organic semiconductor layer, and forming a gate electrode on the gate insulating layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the Drawings.

DETAILED DESCRIPTION OF THE PREFERRED EMBODIMENTS

Reference will now be made in detail to the preferred embodiments, examples of which are illustrated in the accompanying drawings.

FIGS. 3A to 3F are cross-sectional views showing a process of fabricating an array substrate for an LCD device having an organic semiconductor layer according to an exemplary embodiment of the invention. A pixel region "P" having a switching element on an array substrate is shown in FIGS. 3A to 3F. A switching region "TrA" is defined within the pixel region "P" in which a TFT "T" is formed as the switching element.

Although not shown, a buffer layer may be formed first on a substrate by depositing a material, such as silicon oxide. The silicon oxide has an excellent adhesive property in bonding to the substrate and also has a hydrophilic property. The substrate is a transparent insulating material, such as glass or plastic. The buffer layer is formed to improve adhesion between the organic semiconductor layer and the substrate. Moreover, the organic semiconductor layer will have a more uniform thickness due to the presence of the buffer layer.

Figure 1:
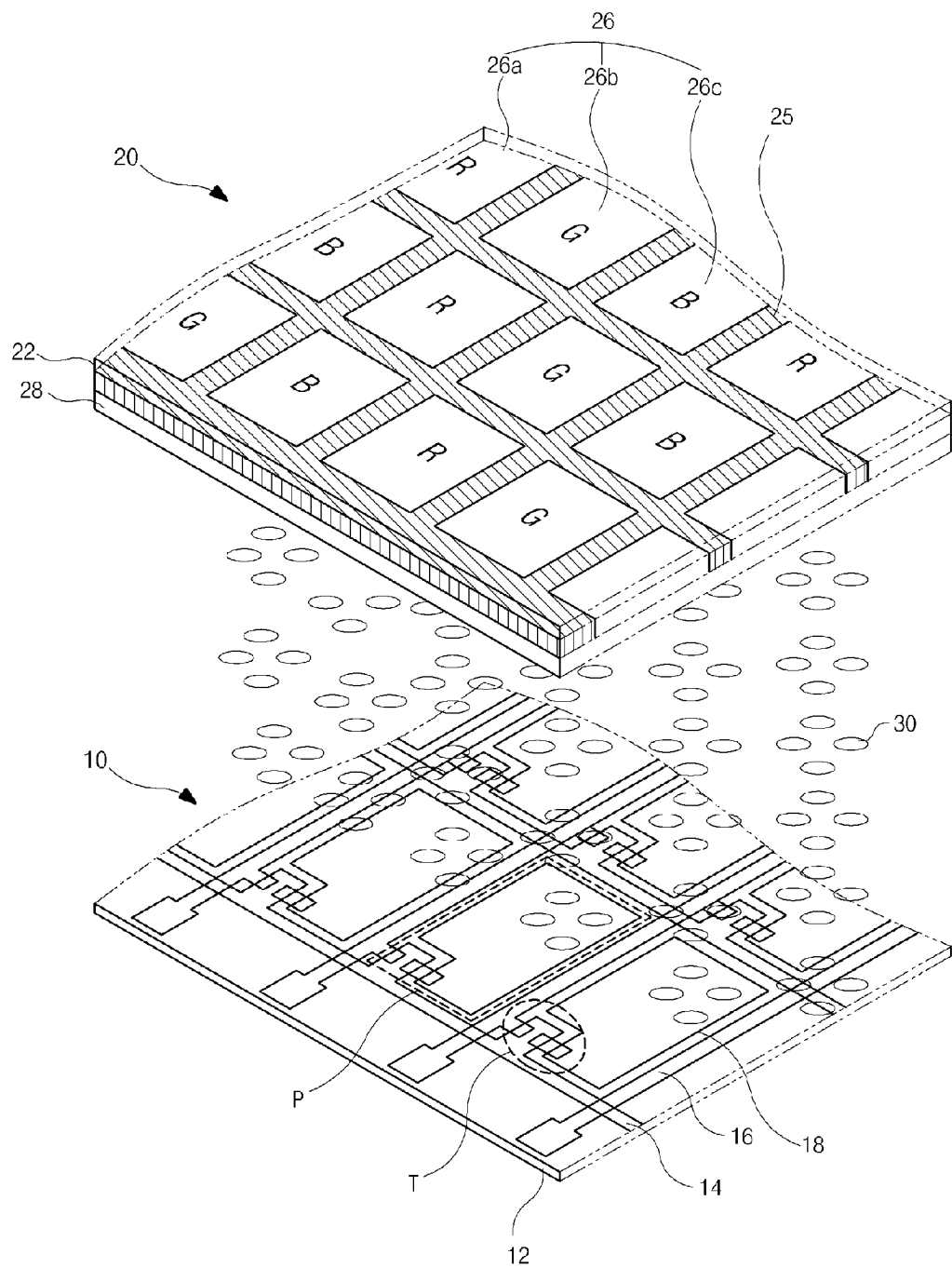
FIG. 1 is an exploded perspective view of a related art LCD device.
Figure 2:
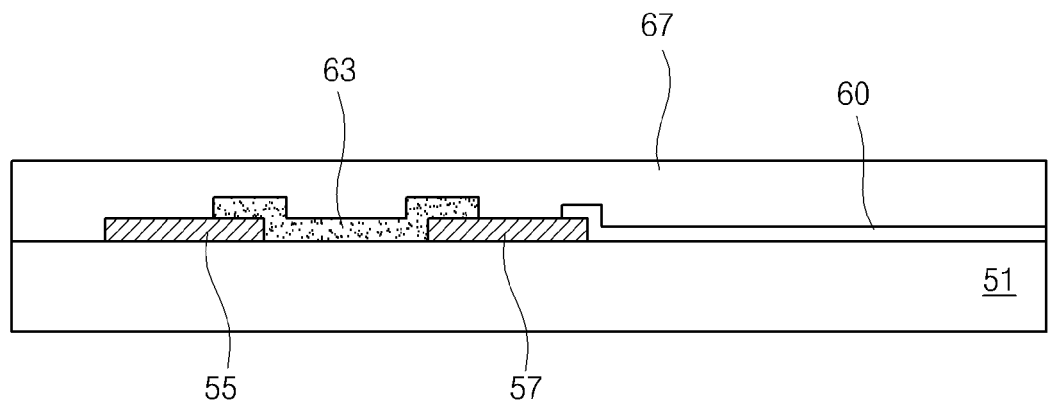
FIG. 2 is a cross-sectional view showing an array substrate for an LCD device according to the related art.
Figure 3A:
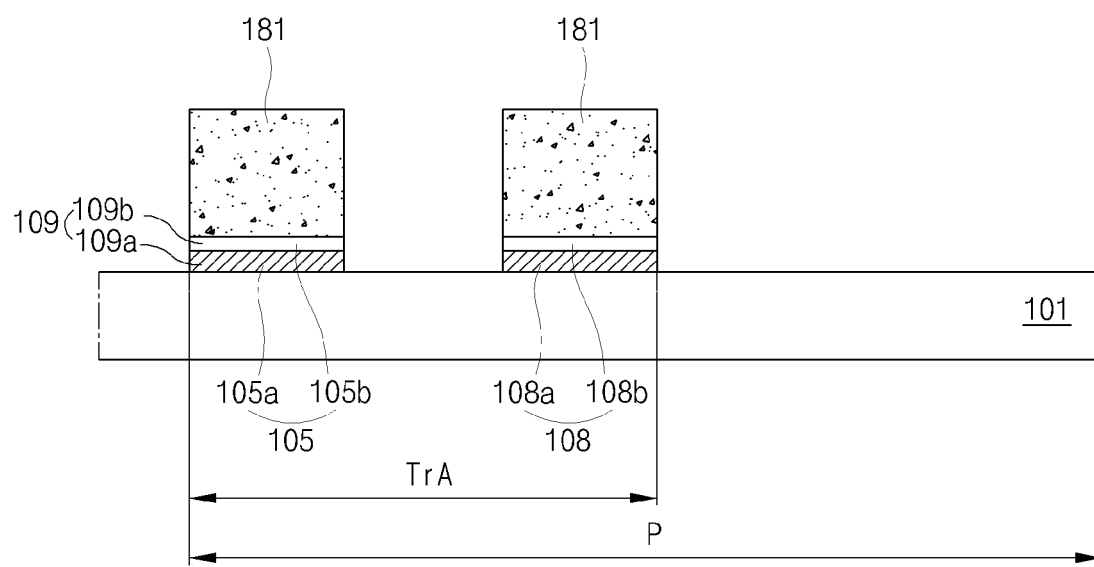
FIGS. 3A to 3F are cross-sectional views showing a process of fabricating an array substrate for an LCD device having an organic semiconductor layer according to an exemplary embodiment of the invention.

As shown in FIG. 3A, source and drain electrodes 105 and 108 are formed in the switching region "TrA" on the substrate 101 by depositing and patterning a first metal layer (not shown) and a transparent conductive material layer (not shown) using a mask (not shown). The first metal layer is formed on the substrate 101 by depositing a low resistant metal, which includes one of antigen (Ag), aluminum (Al), aluminum alloy (AlNd), molybdenum (Mo), copper (Cu) and copper alloy, at a temperature of less than 200° C. The transparent conductive material layer is formed on the first metal layer by depositing ITO, which has a relatively high work function. A photoresist (PR) pattern 181 is formed on the transparent conductive material layer by coating and patterning a PR layer (not shown). Then, the first metal layer and the transparent conductive material layer are patterned using the PR pattern 181 as a patterning mask such that the source and drain electrodes 105 and 108 are formed on the substrate 101. The source and drain electrodes 105 and 108 have a double-layered structure. At the same time, a data line (not shown) is formed on the substrate 101. The data line also includes the double-layered structure. Then, the PR pattern 181 is removed from the first source electrode 105b and the first drain electrode 108b.

The source electrode 105 includes a first low resistant metal layer 105a and a first transparent conductive material layer 105b. The drain electrode 108 includes a second low resistant metal layer 108a and a second transparent conductive material layer 108b. The first and second low resistant metal layers 105a and 108a are formed from the first metal layer, and the first and second transparent conductive material layers 105b and 108b are formed from the transparent conductive material layer.

The source electrode 105 extends from the data line and is separated from the drain electrode 108. Hereinafter, the first and second low resistant metal layers 105a and 108a are referred to as a first source electrode 105a and a first drain electrode 108a. The first and second transparent conductive material layers 105b and 108b are referred to as a second source electrode 105b and a second drain electrode 108b. Similarly, the data line includes first and second data lines.

Figure 3B:
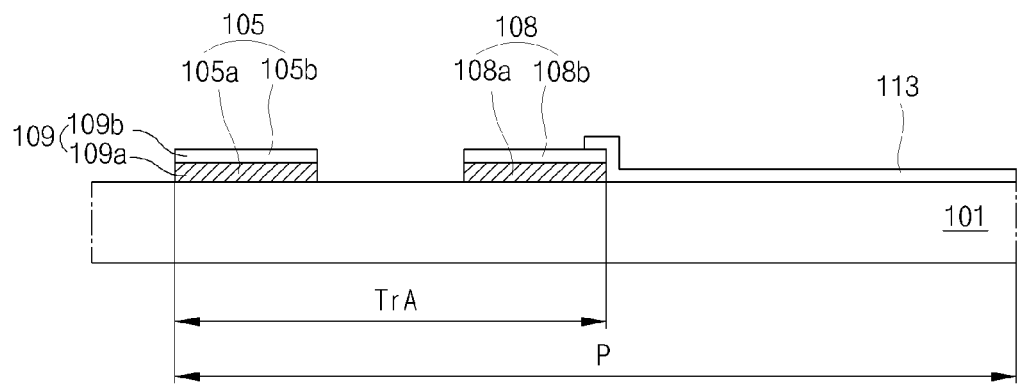

Next, as shown in FIG. 3B, a pixel electrode 113 is formed in the pixel region "P" on the substrate 101 by depositing and patterning a transparent conductive material using a mask (not shown). The pixel electrode 113 contacts the drain electrode 108. The transparent conductive material includes one of ITO and indium-zinc-oxide.

When the pixel electrode 113 is formed of IZO and an etchant is used for patterning the pixel electrode 113, the second source electrode 105b and the second drain electrode 108b, which are formed of ITO, can also be affected by the etchant. Thus, when the pixel electrode 113 is formed of ITO, etching time is controlled while forming the pixel electrode 113 to prevent damage to the second source electrode 105b and the second drain electrode 108b.

Figure 3C:
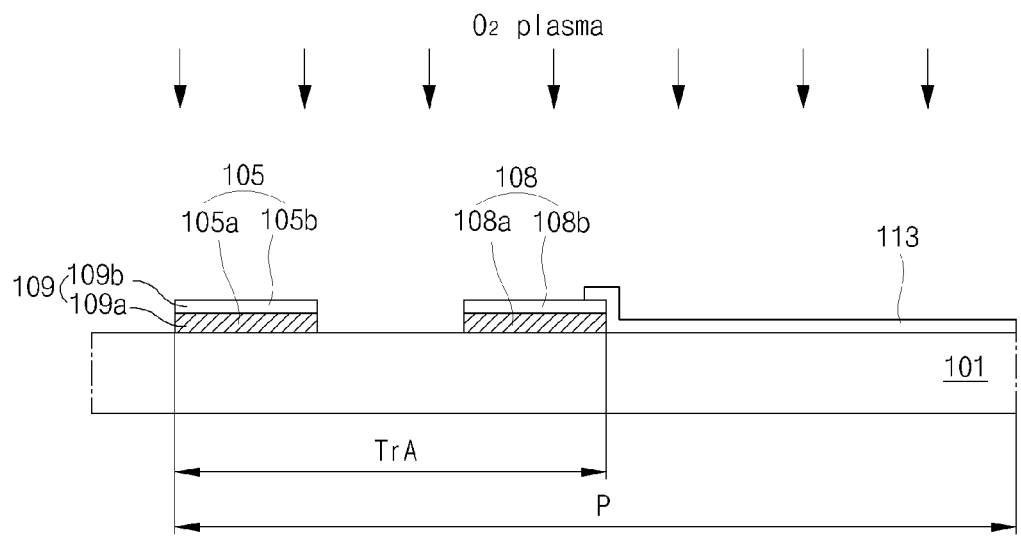

Next, as shown in FIG. 3C, a plasma process using oxygen ($O_2$) is performed on the substrate 101 including the source electrode 105, the drain electrode 108 and the pixel electrode 113 to increase the work function of ITO of the second source electrode 105b and the second drain electrode 108b. As a result of the plasma process, ITO the work function is increased to about 4.8 eV or 4.9 eV.

Next, an organic semiconductor material layer, a gate insulating material layer and a second metal layer are sequentially formed on the source and drain electrodes 105 and 108, the data line (not shown) and the pixel electrode 113. The organic semiconductor material layer is formed of an organic semiconductor material, which has high mobility and low molecular weight. The organic semiconductor material may include one of pentacene and polythiophene. The organic semiconductor material is coated by using one of an ink-jet device, a nozzle coating device, a bar coating device, a slit coating device, a spin coating device and a printing device. The gate insulating material layer is formed of an organic insulating material, such as fluoropolymer. The second metal layer is formed of a metal material, such as molybdenum (Mo) and chromium (Cr). The metal material is a dry-etchable material.

Figure 3D:
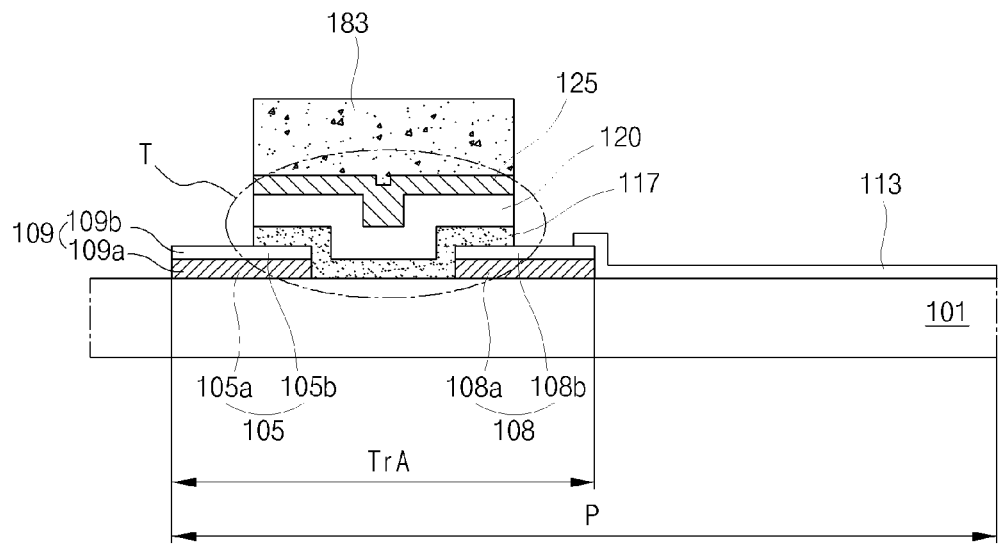

As shown in FIG. 3D, the organic semiconductor layer 117, the gate insulating layer 120, the gate electrode 125 and the photosensitive pattern 183 are sequentially formed on the source and drain electrodes 105 and 108. First, the photosensitive pattern 183 is formed on the second metal layer by coating and patterning a photosensitive material layer (not shown). The photosensitive material layer is formed of one of the PR, polyvinylalcohol and photoacrylate. Then, the organic semiconductor material layer, the gate insulating material layer and the second metal layer, which are exposed by the photosensitive pattern 183, are etched using the photosensitive pattern 183 as a patterning mask such that the organic semiconductor layer 117, the gate insulating layer 120 and the gate electrode 125 are formed on the source and drain electrodes 105 and 108. The photosensitive pattern 183 is then removed.

Accordingly, the data line (not shown) and the pixel electrode 113 are exposed by the organic semiconductor layer 117, the gate insulating layer 120 and the gate electrode 125. The organic semiconductor layer 117, the gate insulating layer 120 and the gate electrode 125 have an island shape in the switching region "TrA" on the source and drain electrodes 105 and 108. The source and drain electrodes 105 and 105, the organic semiconductor layer 117, the gate insulating layer 120 and the gate electrode 125 constitute the TFT "T" as the switching element.

Figure 3E:
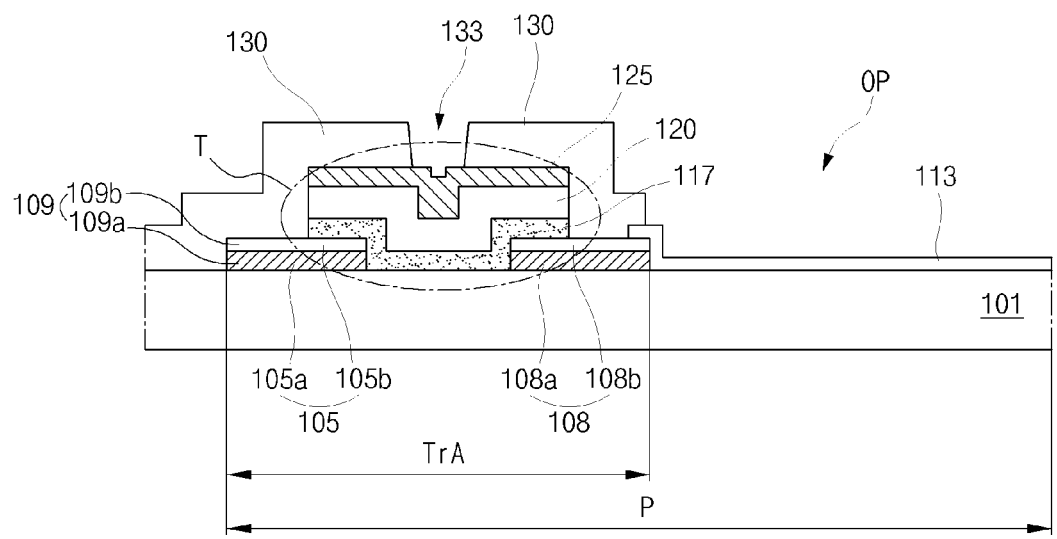

Next, as shown in FIG. 3E, a passivation layer 130, including a gate contact hole 133 and an open portion "OP," is formed on the gate electrode 125 by coating and patterning an organic insulating material. The gate contact hole 133 and the open portion "OP" expose portions of the gate electrode 125 and the pixel electrode 113, respectively. The organic insulating material may include benzocyclobutane (BCB), photoacrylate, polyvinylalcohol and fluoropolymer. However, when the photosensitive pattern 183, as shown in FIG. 3D, is formed from one of polyvinylalcohol and photoacrylate, the passivation layer 130 may be formed of the same material as the photosensitive pattern 183 (of FIG. 3D) on the photosensitive pattern 183 (of FIG. 3D) without removing the photosensitive pattern 183 (of FIG. 3D).

Figure 3F:
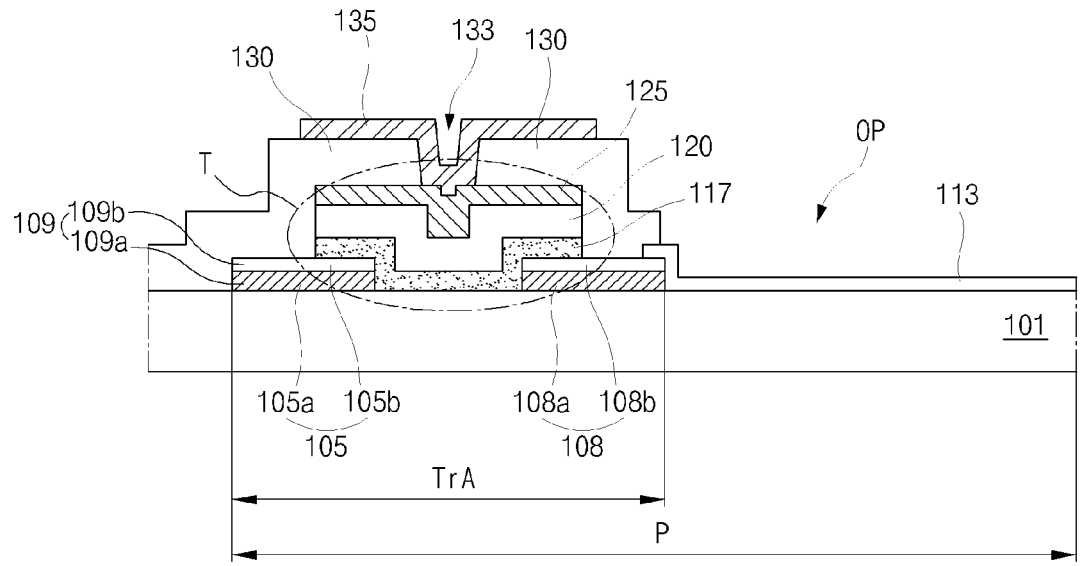

Next, as shown in FIG. 3F, a gate line 135 is formed on the passivation layer 130 by depositing and patterning a third metal layer (not shown). The third metal layer includes Al, AlNd, Mo, Cu and copper alloy and is deposited at a temperature of less that 200° C. The gate line 135 is connected to the gate electrode 125 through the gate contact hole 133. The gate line 135 crosses the data line (not shown) to define the pixel region "P." Although not shown, another passivation layer may be formed on the gate line 135.

As mentioned above, to reduce production costs of the array substrate, ITO having a relatively high work function is used instead of gold. Moreover, to decrease resistance of the TFT, a metal layer having low resistance is formed under the ITO layer such that the source and drain electrodes have a double-layered structure. Unfortunately, when the first source electrode 105a of the low resistance metal and the second source electrode 105b of ITO are etched, the ends of the first source electrode 105a and the second source electrode 105b may no longer coincide. Since the low resistant metal is exposed to a first etchant, used for forming the second source electrode 105b, and then a second etchant is used for forming the pixel electrode 113, there is a problem of the first source electrode 105a being undercut. Undercutting of the first source electrode may disconnect the TFT. Hereinafter, another method of fabricating an array substrate to prevent undercutting of the first source electrode will now be explained.

FIGS. 4A to 4F are cross-sectional views showing a process of fabricating an array substrate for an LCD device having an organic semiconductor layer according to an exemplary embodiment of the invention. The pixel region P having a TFT "T" on the substrate is shown in FIGS. 4A to 4F.

Although not shown, a buffer layer may be formed first on a substrate by depositing a material, such as silicon oxide. The silicon oxide has an excellent adhesive property in bonding to the substrate and also has a hydrophilic property. The substrate is a transparent insulating material, such as glass or plastic. The buffer layer is formed to improve adhesion between the organic semiconductor layer and the substrate. Moreover, the organic semiconductor layer will have a more uniform thickness due to the presence of the buffer layer. However, the buffer layer is not essential.

Figure 4A:
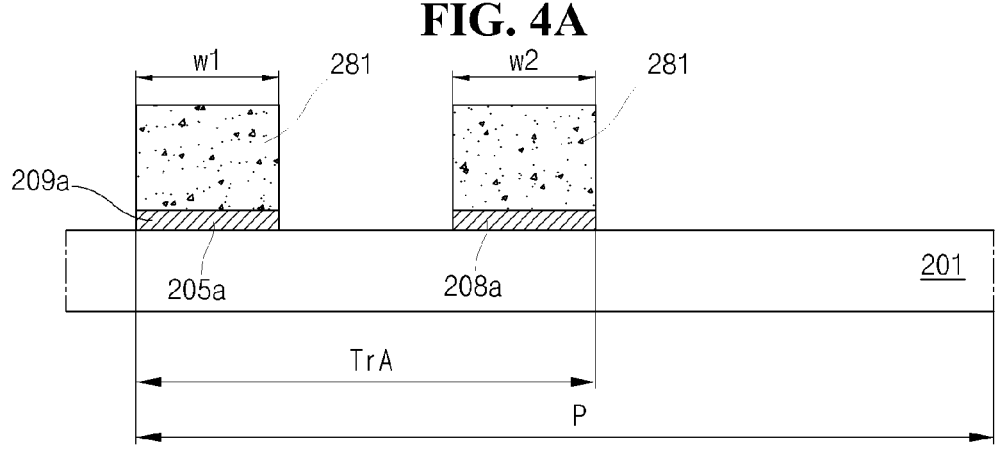
FIGS. 4A to 4F are cross-sectional views showing a process of fabricating an array substrate for an LCD device having an organic semiconductor layer according to an exemplary embodiment of the invention.

Next, as shown in FIG. 4A, the first metal layer (not shown) and a first PR layer (not shown) are sequentially formed on the substrate 201. The first metal layer is formed of a low resistance metal, such as Ag, Al, AlNd, Mo, Cu and copper alloy at a temperature of less than 200° C. The first PR layer is formed on the first metal layer.

Then, a first PR pattern 281 is formed on the first metal layer (not shown) by patterning the first PR layer (not shown). Sequentially, the first source electrode 205a and the first drain electrode 208a are formed from the first metal layer (not shown) in the switching region "TrA" on the first substrate 201 using the first PR pattern 281 as a patterning mask. The first source electrode 205a and the first drain electrode 208a are separated from each other. The first source electrode 205a and the first drain electrode 208a have first and second widths "W1" and "W2", respectively. At the same time, the first data line (not shown) is formed from the first metal layer (not shown) on the substrate 201. The first source electrode 205a extends from the first data line (not shown). Then, the first PR pattern 281 is removed.

Figure 4B:
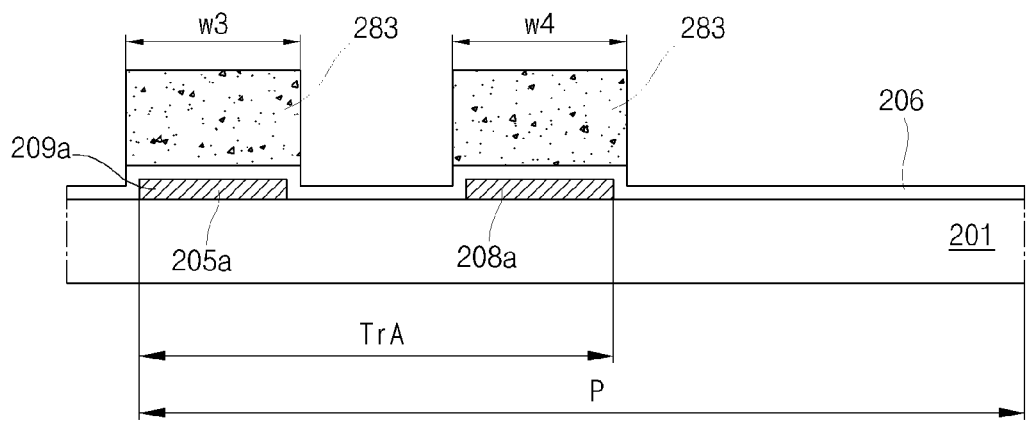

Next, as shown in FIG. 4B, a first transparent conductive material layer 206 and a second PR layer (not shown) are sequentially formed on the first source electrode 205a, the first drain electrode 208a and the first data line (not shown). The second PR layer (not shown) is patterned to form a second PR pattern 283. The second PR pattern 283 on the first source electrode 205a has a third width "W3". The third width "W3" is greater than the first width "W1". The second PR pattern 283 on the first drain electrode 208a has a fourth width "W4". The fourth width "W4" is greater than the second width "W2".

The second PR pattern 283 may be patterned using a mask used for forming the first PR pattern 281 (of FIG. 4A). By controlling magnification during exposure of the second PR layer, the second PR pattern 283 has the third and fourth widths "W3" and "W4" less that the first and second widths "W1" and "W2", respectively. In other words, by controlling magnification of an exposure beam onto the mask, the second PR pattern 283 can be obtained.

Figure 4C:
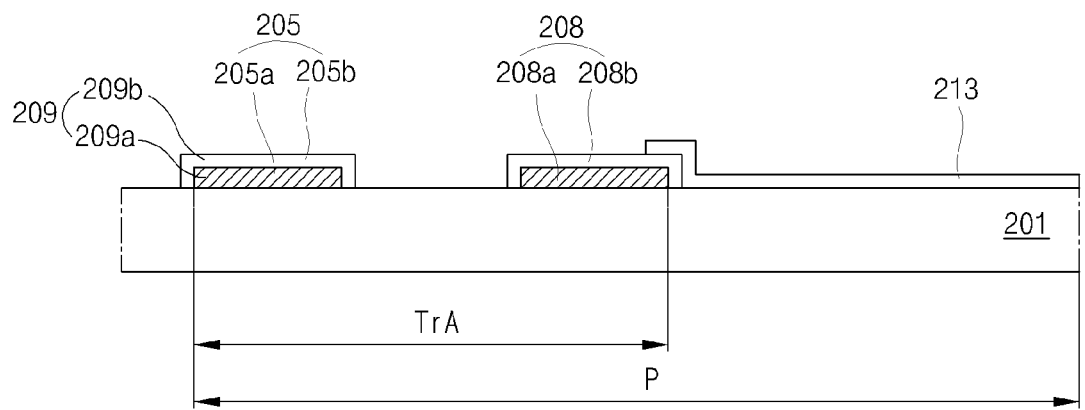

Next, as shown in FIG. 4C, the second source electrode 205b, the second drain electrode 208b are formed on the first source electrode 205a and the first drain electrode 208a by patterning the first transparent conductive material layer 206 (of FIG. 4B) using the second PR pattern 283 as a pattering mask. The second source electrode 205b covers an upper surface and side surfaces of the first source electrode 205a on the substrate 201 such that the first source electrode 205a is not exposed. Similarly, the second drain electrode 208b covers an upper surface and side surfaces of the first drain electrode 208a on the substrate 201 such that the first drain electrode 208a is not exposed. In other words, the second source electrode 205b and the second drain electrode 208b clad the first source electrode 205a and the first drain electrode 208a, respectively. The first and second source electrodes 205a and 205b constitute the source electrode 205, and the first and second drain electrodes 208a and 208b constitute the drain electrode 208. A second data line (not shown) clads the first data line (not shown).

In this case, when the first transparent conductive material layer 206 (of FIG. 4B) is patterned using an etchant to form the second source electrode 205b, the second drain electrode 208b and the second data line (not shown), there is no under cutting of the first source electrode 205a, the first drain electrode 208a and the first data line (not shown) due to the cladding of the second source electrode 205b, the second drain electrode 208b and the second data line (not shown). Moreover, since the mask used for forming the first PR pattern 281 (of FIG. 4A) can be used for forming the second PR pattern 283 (of FIG. 4B), there are no additional costs for an additional mask.

Then, the second PR pattern 283 (of FIG. 4B) is removed. The pixel electrode 213 is formed in the pixel region "P" on the substrate 201 by depositing and patterning a second transparent conductive material layer (not shown), including one of ITO and IZO. The pixel electrode 213 contacts the drain electrode 208. Since the first drain electrode is not exposed, the pixel electrode 213 contacts the second drain electrode 208b. When the pixel electrode 213 is formed of ITO, which is the same material as the second source electrode 205b and the second drain electrode 208b, etching time is controlled such that the second transparent conductive material layer, excluding the second source electrode 205b and the second drain electrode 208b, is removed. When the pixel electrode 213 is formed of IZO, which is different from the second source electrode 205b and the second drain electrode 208b, an etchant of the IZO does not etch the second source electrode 205b and the second drain electrode 208b.

Next, a plasma process using $O_2$ is performed on the substrate, including the source and drain electrodes 205 and 208, and the pixel electrode 213, to improve the work function of ITO in the second source electrode 205b and the second drain electrode 208b.

Next, although not shown, an organic semiconductor material layer, a gate insulating material layer and a second metal layer are sequentially formed on the source and drain electrodes 205 and 208, the data line (not shown) and the pixel electrode 213. The organic semiconductor material layer is formed of an organic semiconductor material, which has relatively excellent mobility and low molecular weight. The organic semiconductor material may include one of pentacene and polythiophene. The organic semiconductor material is coated by using one of an ink-jet device, a nozzle coating device, a bar coating device, a slit coating device, a spin coating device and a printing device. The gate insulating material layer is formed of an organic insulating material, such as fluoropolymer. The second metal layer is formed of a metal material, such as molybdenum (Mo) and chromium (Cr). It is a dry-etchable material.

Figure 4D:
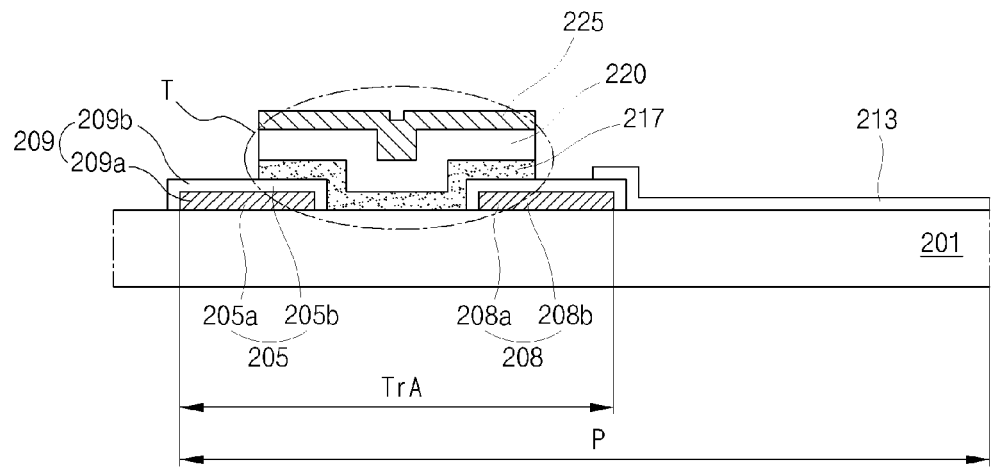

As shown in FIG. 4D, an organic semiconductor layer 217, a gate insulating layer 220, a gate electrode 225 and the photosensitive pattern (not shown) are sequentially formed on the source and drain electrodes 205 and 208. First, the photosensitive pattern (not shown) is formed on the second metal layer by coating and patterning a photosensitive material layer (not shown). The photosensitive material layer is formed of one of photoresist, polyvinylalcohol and photoacrylate. Then, the organic semiconductor material layer, the gate insulating material layer and the second metal layer, which are exposed by the photosensitive pattern (not shown), are etched using photosensitive pattern (not shown) as a patterning mask such that the organic semiconductor layer 217, the gate insulating layer 220 and the gate electrode 225 are formed on the source and drain electrodes 205 and 208. The photosensitive pattern (not shown) is removed.

Accordingly, the data line (not shown) and the pixel electrode 213 are exposed by the organic semiconductor layer 217, the gate insulating layer 220 and the gate electrode 225. The organic semiconductor layer 217, the gate insulating layer 220 and the gate electrode 225 have an island shape in the switching region "TrA" on the source and drain electrodes 205 and 208. The source and drain electrodes 205 and 208, the organic semiconductor layer 217, the gate insulating layer 220 and the gate electrode 225 constitute the TFT "T".

Figure 4E:
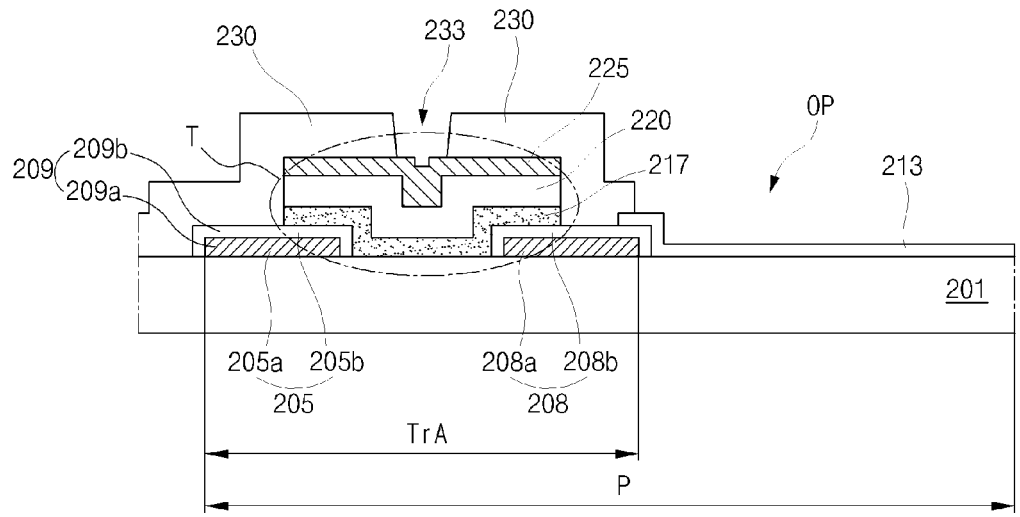

Next, as shown in FIG. 4E, the passivation layer 230, including the gate contact hole 233 and the open portion "OP," is formed on the gate electrode 225 by coating and patterning an organic insulating material. The gate contact hole 233 and the open portion "OP" expose the gate electrode 225 and the pixel electrode 213, respectively. The organic insulating material may include benzocyclobutane (BCB), photoacrylate, polyvinylalcohol and fluoropolymer. However, when the photosensitive pattern (not shown) is formed from one of polyvinylalcohol and photoacrylate, the passivation layer 230 may be formed of a same material as the photosensitive pattern (not shown) on the photosensitive pattern (not shown) without removing the pattern (not shown).

Figure 4F:
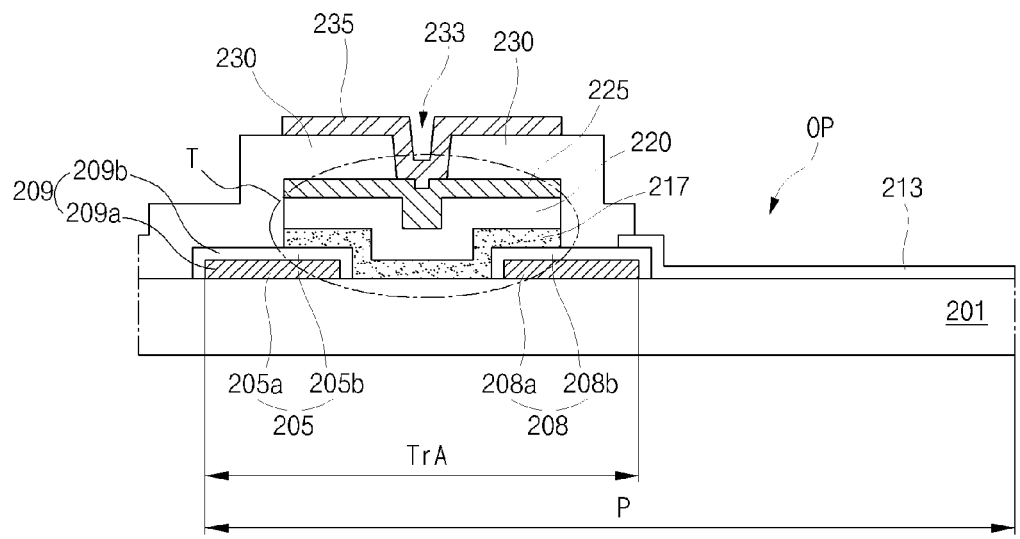

Next, as shown in FIG. 4F, a gate line 235 is formed on the passivation layer 230 by depositing and pattering a third metal layer (not shown). The third metal layer includes Al, AlNd, Mo, Cu and copper alloy and is deposited under a temperature less that 200° C. The gate line 235 is connected to the gate electrode 225 through the gate contact hole 233. The gate line 235 crosses the data line (not shown) such that the pixel region P is defined. Though not shown, another passivation layer may be formed on the gate line 235.

Figure 5A:
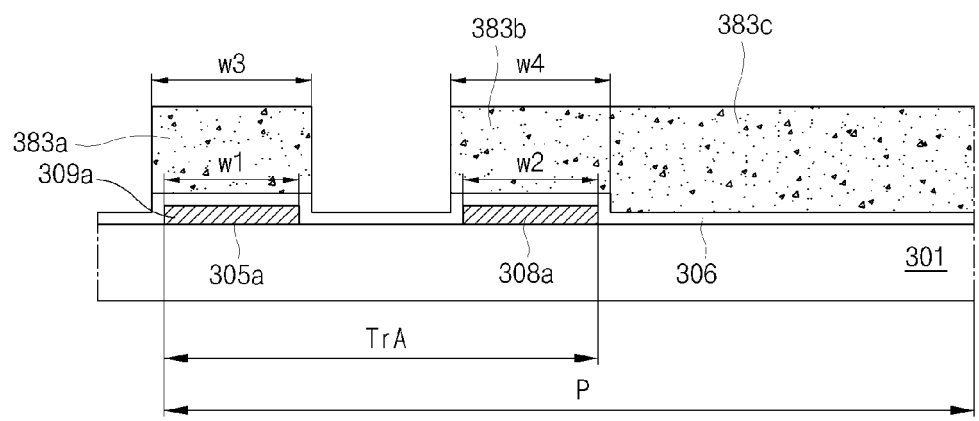
FIGS. 5A to 5C are cross-sectional views showing a process of fabricating an array substrate for an LCD device having an organic semiconductor layer according to an exemplary embodiment of the invention.
Figure 5B:
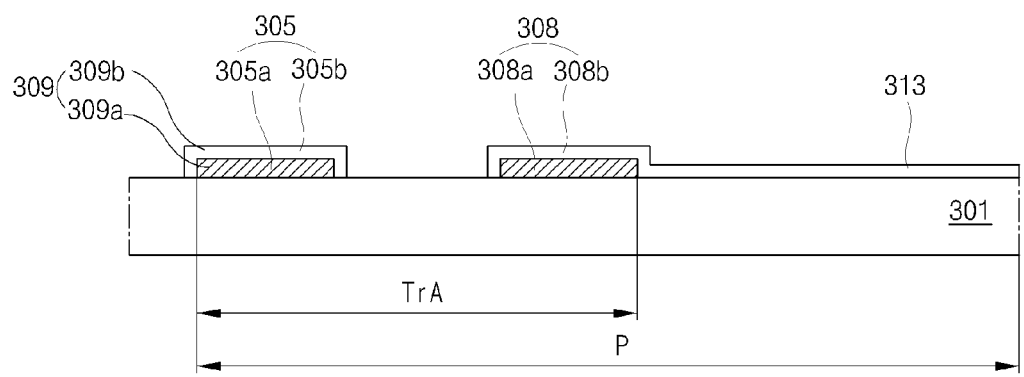
Figure 5C:
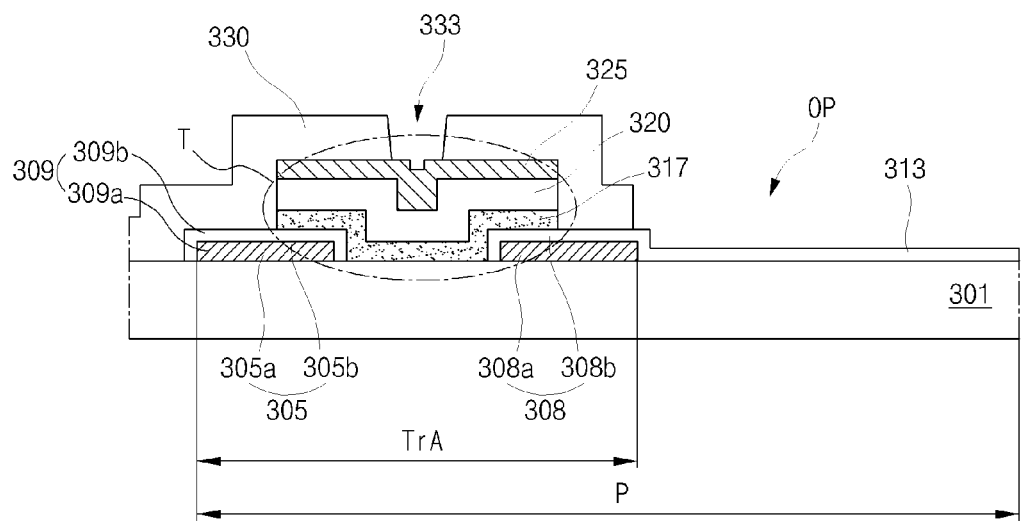

FIGS. 5A to 5C are cross-sectional views showing a process of fabricating an array substrate for an LCD device having an organic semiconductor layer according to an exemplary embodiment of the invention. As shown in FIG. 5A, the first source electrode 305a, the first drain electrode 308a and the first data line (not shown) are formed on the substrate 301 by depositing and patterning a low resistance metal material, such as Ag, Al, AlNd, Mo, Cu and copper alloy. The first source electrode 305a and the first drain electrode 308a are located in the switching region "TrA" in the pixel region P. The first source electrode 305a and the first drain electrode 308a are separated from each other and have first and second widths "W1" and "W2", respectively. The transparent conductive metal layer 306 is formed over an entire surface of the substrate 201, including the first source electrode 305a, the first drain electrode 308a and the first data line (not shown). The transparent conductive material layer 306 includes ITO having a relatively high work function.

Then, first, second and third PR patterns 383a, 383b and 383c are formed on the transparent conductive material layer 306 by coating and patterning a PR layer (not shown). The first and second PR patterns 383a and 383b correspond to the first source electrode 305a and the first drain electrode 308a, respectively, and the third PR pattern 383c corresponds to the transparent conductive material layer 306 in the pixel region "P" excluding the switching region "TrA". The transparent conductive material layer 306 between the first source electrode 305a and the first drain electrode 308a is exposed by the first and second PR patterns 383a and 383b. The first and second PR patterns 383a and 383b have third and fourth widths "W3" and "W4", respectively. The third and fourth widths "W3" and "W4" are greater than the first and second widths "W1" and "W2", respectively.

Next, as shown in FIG. 5B, the second source electrode 305b, the second drain electrode 308b and the pixel electrode are formed on the substrate 301 by patterning the transparent conductive material layer 306 using the first to third PR patterns 383a, 383b and 383c using a patterning mask. The second source electrode 305b wholly covers the first source electrode 305a, and the second drain electrode 308b wholly covers the first drain electrode 308a. In other words, the second source electrode 305b and the second drain electrode 308b have the clad the first source electrode 305a and the first drain electrode 308a, respectively.

The second source electrode 305b and the second drain electrode 308b are located on the first source electrode 305a and the first drain electrode 308a, respectively, such that the second source electrode 305b and the second drain electrode 308b are separate from each other. The first and second source electrode 305a and 305b constitute the source electrode 305, and the first and second drain electrode 308a and 308b constitute the drain electrode 308. The pixel electrode 313 extending from the second drain electrode 308b is located in the pixel region "P," excluding the switching region "TrA". At the same time, the second data line (not shown) is formed on the first data line (not shown). In other words, the pixel electrode 313 is formed of the same material as the second source electrode 305b and the second drain electrode 308b and in the same process of forming the second source electrode 305b and the second drain electrode 308b. Although different masks are used for forming the first source electrode 305a and the first drain electrode 308a, and the second source electrode 305b and the second drain electrode 308b, production costs are not increased because the pixel electrode is formed in the same process as the second source electrode 305b and the second drain electrode 308b.

Next, a plasma process using $O_2$ is performed on the substrate, including the source electrode 305, the drain electrode 308, the data line (not shown) and the pixel electrode 313. As shown in FIG. 5C, the organic semiconductor layer 317, the gate insulating layer 320 and the gate electrode 325 are sequentially formed on the source and drain electrodes 305 and 308. The passivation layer 330 including the gate contact hole 333 and the open portion "OP" is formed on the gate electrode 325. The gate contact hole 333 and the open portion "OP" expose the gate electrode 325 and the pixel electrode 313, respectively. Finally, the gate line (not shown) is formed on the passivation layer 330. The gate line (not shown) is connected to the gate electrode 325 through the gate contact hole 333. The gate line (not shown) crosses the data line (not shown) to define the pixel region "P." Another passivation layer (not shown) may be formed on the gate line (not shown).

It will be apparent to those skilled in the art that various modifications and variations can be made in embodiments of the invention without departing from the spirit or scope of the invention. Thus, it is intended that embodiments of the invention cover the modifications and variations of this invention provided they come within the scope of the appended claims and their equivalents.

What is claimed is:

1. An array substrate for a liquid crystal display device, comprising:

a first source electrode and a first drain electrode on a substrate, wherein the first source electrode and the first drain electrode are separated from each other and formed of a metallic material;

a second source electrode and a second drain electrode on the first source electrode and the first drain electrode, respectively, and are formed of a transparent conductive material, wherein the second source electrode covers an upper surface of the first source electrode, and the second drain electrode covers an upper surface of the first drain electrode;

a pixel electrode on the substrate and contacting the second drain electrode on the substrate;
an organic semiconductor layer on the substrate;
a gate insulating layer on the organic semiconductor layer;
a gate electrode on the gate insulating layer;
a first passivation layer including a gate contact hole on the gate electrode, the gate contact hole exposing the gate electrode; and
a gate line on the passivation layer and contacting the gate electrode through the gate contact hole.

2. The substrate according to claim 1, further comprising:
a first data line extending form the first source electrode and being formed of a same layer and with a same material as the first source electrode; and
a second data line extending form the second source electrode and being formed of a same layer and with a same material as the second source electrode.

3. The substrate according to claim 2, wherein the second data line covers an upper surface of the first data line.

4. The substrate according to claim 3, wherein the second data line covers side surfaces of the first data line.

5. The substrate according to claim 1, wherein the first passivation layer includes an open portion exposing the pixel electrode.

6. The substrate according to claim 1, further comprising a second passivation layer on the gate line.

7. The substrate according to claim 1, wherein the transparent conductive material includes one of indium-tin-oxide and indium-zinc-oxide.

8. The substrate according to claim 1, wherein the pixel electrode is formed in a same layer and of a same material as the second drain electrode.

9. The substrate according to claim 1, wherein the metallic material includes one of antigen, aluminum, aluminum alloy, molybdenum, copper and copper alloy.

10. The substrate according to claim 1, wherein the organic semiconductor layer, the gate insulating layer and the gate electrode have a same shape as one another.

11. The substrate according to claim 10, wherein the organic semiconductor layer, the gate insulating layer and the gate electrode have end lines coinciding with one another.

12. The substrate according to claim 1, further comprising a buffer layer between the substrate and the organic semiconductor layer.

13. The substrate according to claim 1, wherein the second source electrode covers side surfaces of the first source electrode and the second drain electrode covers side surfaces of the first drain electrode.

14. The substrate according to claim 1, wherein the organic semiconductor layer is formed on the second source and drain electrodes, and the gate insulating layer and the gate electrode are sequentially formed on the organic semiconductor layer.

15. The substrate according to claim 1, wherein the gate electrode includes one of molybdenum and Chromium.

16. A method of fabricating an array substrate for a liquid crystal display device, comprising:
forming a first source electrode and a first drain electrode of a metallic material on a substrate separated from each other;
forming a second source electrode and a second drain electrode of a transparent conductive material on the first source electrode and the first drain electrode, respectively, wherein the second source electrode covers an upper surface of the first source electrode, and the second drain electrode covers an upper surface of the first drain electrode;
forming a pixel electrode contacting the second drain electrode on the substrate;
forming an organic semiconductor layer on the substrate;
forming a gate insulating layer on the organic semiconductor layer;
forming a gate electrode on the gate insulating layer;
forming a first passivation layer including a gate contact hole on the gate electrode, the gate contact hole exposing the gate electrode; and
forming a gate line on the passivation layer and contacting the gate electrode through the gate contact hole.

17. The method according to claim 16, further comprising:
forming a first data line extending from the first source electrode; and
forming a second data line extending from the second source electrode.

18. The method according to claim 17, wherein the second data line covers an upper surface of the first data line.

19. The method according to claim 18, wherein the second data line covers side surfaces of the first data line.

20. The method according to claim 16, wherein the first passivation layer includes an open portion exposing the pixel electrode.

21. The method according to claim 16, further comprising forming a second passivation layer on the gate line.

22. The method according to claim 16, wherein the pixel electrode is simultaneously formed while forming the second drain electrode.

23. The method according to claim 16, wherein the organic semiconductor layer, the gate insulating layer and the gate electrode are formed by using a same mask as one another.

24. The method according to claim 23, wherein the organic semiconductor layer, the gate insulating layer and the gate electrode have end lines coinciding with one another.

25. The method according to claim 16, further comprising forming a buffer layer between the substrate and the organic semiconductor layer.

26. The method according to claim 16, further comprising treating the substrate, including the source and drain electrode, with an oxygen plasma before forming the semiconductor layer.

27. The method according to claim 16, wherein the forming the second source electrode and the second drain electrode uses a same mask as the forming the first source electrode and the first drain electrode.

28. The method according to claim 16, wherein the second source electrode covers side surface of the first source electrode and the second drain electrode covers side surface of the second drain electrode.

* * * * *